Aug. 12, 1958
A. I. APPLETON ET AL
2,847,497
SWITCHGEAR MOUNTING
Filed Jan. 24, 1952
2 Sheets-Sheet 1
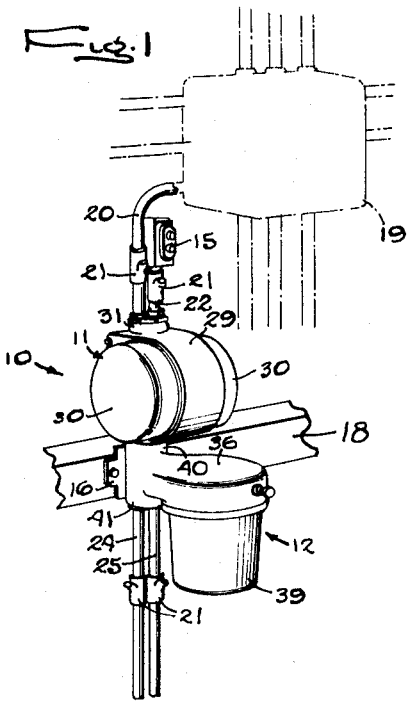
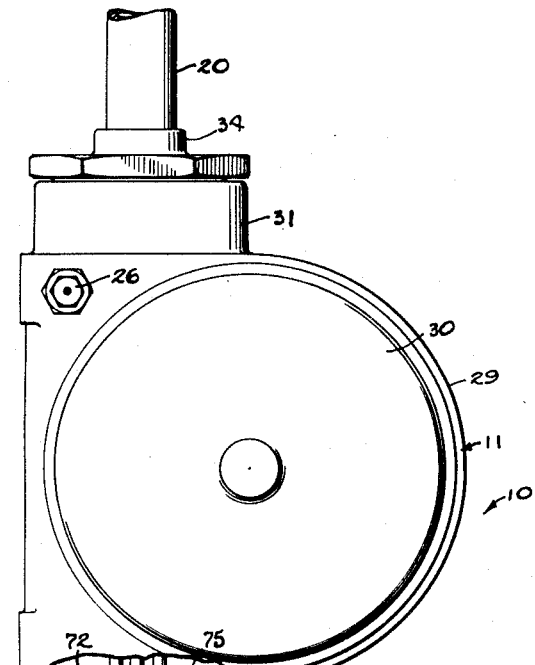
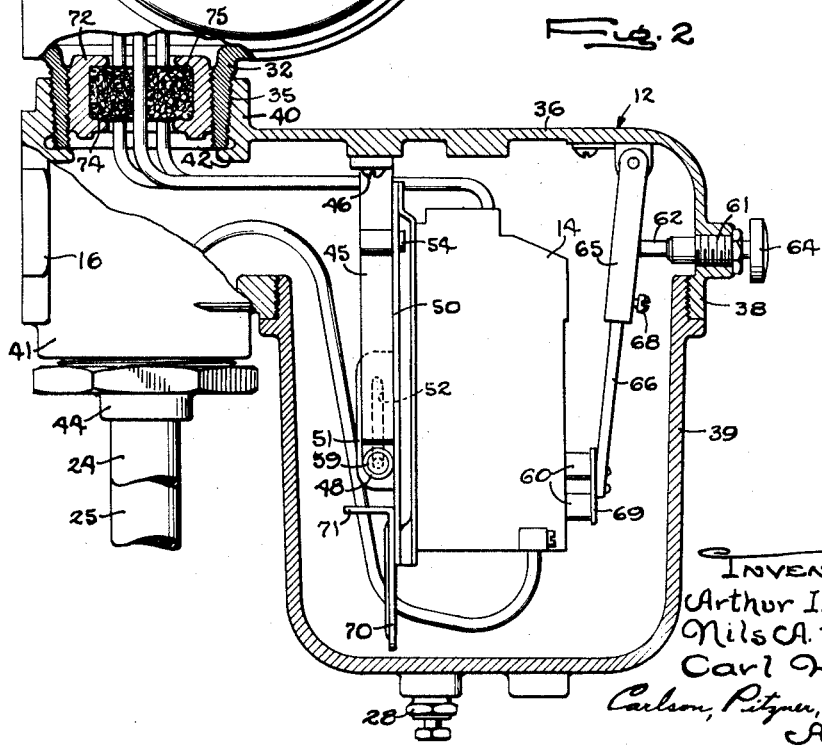
INVENTORS
Arthur I. Appleton
Nils A. Tornblom
Carl H. Lindell
Carlson, Pitzner, Hubbard & Wolfe
ATTORNEYS

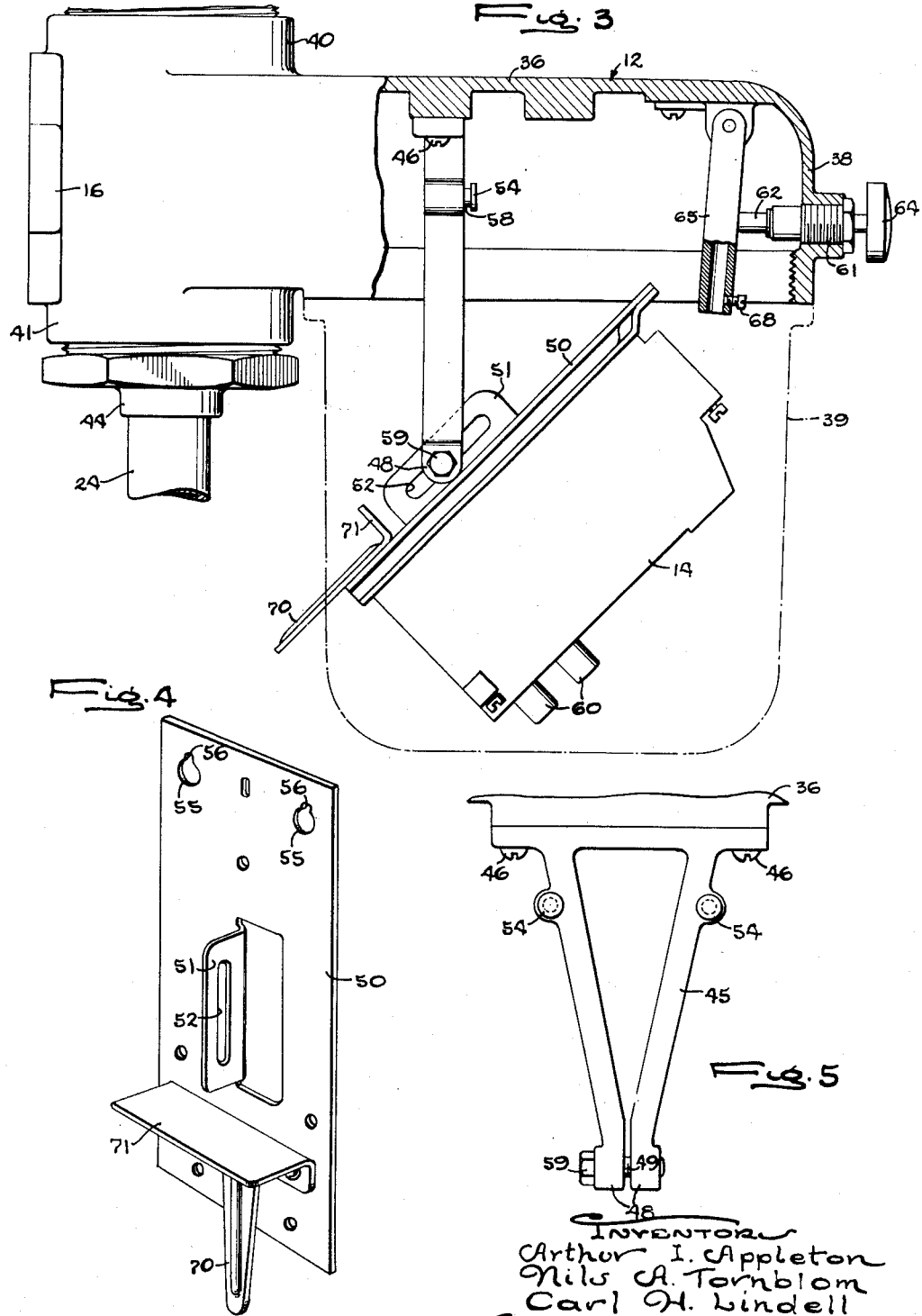

ID Patent Office
2,847,497
Patented Aug. 12, 1958

2,847,497

SWITCHGEAR MOUNTING

Arthur I. Appleton, Northbrook, and Nils A. Tornblom and Carl H. Lindell, Chicago, Ill., assignors to Appleton Electric Company, Chicago, Ill., a corporation of Illinois Application January 24, 1952, Serial No. 267,954

2 Claims. (Cl. 174—52)

The present invention relates generally to switchgear and, more specifically, to a novel switchgear housing which is particularly well adapted for explosion-proof, dustproof and raintight applications.

The object of the invention is to provide novel means for precluding reclosure of the switchgear housing with certain of the switchgear in a displaced condition.

Other objects and advantages will become apparent as the following description proceeds, taken together with the accompanying drawings, in which:

Figure 1 is a perspective view showing an illustrative switchgear housing embodying the invention and installed as a part of the electrical system of a plant or building.

Fig. 2 is an enlarged fragmentary vertical sectional view through the illustrative housing shown in Fig. 1.

Fig. 3 is a further enlarged vertical sectional view through a portion of the housing shown in Fig. 1.

Fig. 4 is an enlarged perspective view of a switchgear mounting used in the illustrative housing of Fig. 1.

Fig. 5 is an enlarged front elevation of a novel depending bracket which carries the mounting illustrated in Fig. 4.

While the invention is susceptible of various modifications and alternative constructions, a certain preferred embodiment has been shown in the drawings and will be described below in considerable detail. It should be understood, however, that there is no intention to limit the invention to the specific form disclosed, but on the contrary, the intention is to cover all modifications and alternative constructions falling within the spirit and scope of the invention as expressed in the appended claims.

Referring more specifically to the drawings, the invention is there shown exemplified in an illustrative switchgear housing 10 which happens to be of the explosion-proof type. The housing 10 in this instance comprises a first casing 11 and a second casing 12, each of generally cylindrical form. The casing 11, which for purposes of description will be referred to as the upper casing, houses a circuit breaker (not shown) which may be connected in the power supply circuit of an electric motor (not shown). The casing 12, which will be referred to descriptively herein as the lower casing, contains an electrical contactor 14 also in the motor circuit and which includes thermal overload protection. The contactor 14 may be actuated as by means of a push-button control station 15 located immediately adjacent the housing 10, as shown in Fig. 1, or situated alternatively in a more remote location. The housing 10 may be equipped with mounting ears 16 and attached to a suitable structural support 18 adapted to hold one or more such housings. Power from the electrical system of the plant or building in which the housing 10 is installed may be supplied from a junction box 19 via a conduit 20, the latter being mechanically isolated from the interior of the housing as by means of a sealing fitting 21. Additional sealing fittings 21 may be interposed in the other runs of conduit 22, 24 and 25 connected with the housing 10. The housing 10 may also be equipped with an explosion-proof vent fitting 26 and explosion-proof drain fitting 28 (Fig. 2).

To eliminate the need for intricate and expensive castings for making the housing 10 and thus reduce its manufacturing cost substantially, the housing 10 is built up of a plurality of casing units which may be assembled together in pairs or in multiple to fit the needs of a particular installation. Thus the upper casing 11 forms one such unit and comprises an open-ended cylindrical section 29 closed by a pair of convex end covers 30. Integral with the section 29 are a pair of hollow bosses 31, 32 alined along an axis disposed in perpendicular but non-intersecting relation with the main axis of the casing 11 running through the section 29 and covers 30. The boss 31, which for purposes of description will be referred to herein as the upper boss, is connected with the conduit 20 by means of a reducer or adapter 34. The boss 32, which may be descriptively referred to as the lower boss, carries external threads 35 and connects detachably with the lower casing 12.

Referring now to the lower casing 12 (Figs. 2 and 3), it will be perceived that the same comprises a generally cylindrical section 36 having a peripheral skirt 38 which threadedly receives a hollow pot-like cover 39. Integral with the section 36 is a pair of hollow bosses 40, 41 alined upon a common upright axis which is spaced and substantially parallel with the main axis of the lower casing 12. The boss 40 is internally threaded and receives the threaded boss 32 of the casing 11, the boss 32 bottoming against an internal stop 42. The boss 41 is internally threaded and in this instance houses a reducer or adapter fitting 44 which connects with the conduits 24, 25 leading from the housing 10. It might be noted that in the present illustrative construction, the mounting ears 16 of the housing 10 happen to be integral with the bosses 40, 41 of the lower casing 12.

Provision is made for supporting the electrical contactor 14 within the lower casing 12 so as to make the contactor readily accessible for wiring, unwiring and any other servicing which might be necessary. In furtherance of such objective, a depending bracket 45 (Figs. 2, 3 and 5) is fixed as by means of screws 46 to the underside of the top wall of the lower casing 12. In this instance, the bracket 45 is of generally triangular form, its lower end terminating in a pair of closely spaced lugs 48 connected by means of a pivot pin 49 which happens to be in the form of a cap screw. Pivotally secured to the bracket 45 is a contactor mounting plate 50 to which the contactor 14 may be attached in any suitable manner. The plate 50, as shown in Fig. 4, has an outstruck tongue 51 situated in the central region thereof and of suitable thickness to fit comfortably between the spaced apart lugs 48 of the bracket 45. The tongue 51 has a longitudinal slot 52 which is engaged by the pivot pin 49. In order to maintain the contactor 14 and its mounting plate 50 in an upright position and nested as far as possible into the peripheral skirt region of the lower casing 12, the bracket 45 has fixed thereto a pair of outwardly projecting retainer lugs 54 similar in shape to the head portion of a flat headed nail. The lugs 54 are respectively adapted to fit through a corresponding pair of retainer apertures 55 in the upper portion of the mounting plate 50. Each of the apertures 55 has a relief notch 56 located adjacent the upper edge of the mounting plate and of suitable size to engage the necked-down portion 58 of each of the lugs 54. Thus if the mounting plate 50 should be rocked about the pivot pin 49 and positioned so that the lugs 54 pass through the apertures 55, the plate 50 and contactor 14 may be retained in this position by sliding them down a slight distance along the face of the bracket 45 so that the relief notches 56 rest upon the necked-down portions 58 of the retainer lugs. To provide further assurance that the members 14, 50 will remain in upright position on the bracket 45, the lugs 48 may be clamped tightly against the tongue 51 by tightening the locking pin 49 by means of its head 59.

As indicated earlier herein, the contactor 14 may have associated therewith a suitable device for protecting against thermal overloads the electric motor to which it may be connected. Such a device would of course open the motor circuit in the event of the thermal overload and would have to be reset as by means of one or two reset plungers 60. To actuate the button 60 from the exterior of the casing 12, the peripheral skirt of the latter carries a threaded sleeve 61. The latter, in turn, supports with a free but relatively close fit a sliding stem 62 terminating in a reset button 64 at its outer end. The stem and button 62, 64 are adapted to impart an inward angular displacement to a sleeve 65 pivoted to the underface of the top wall of the casing 12. The depending end of the sleeve 65 carries a reset arm 66 which is retained therein as by means of a set screw 68. The arm 66 terminates at its lower end in an arm 69 which engages the reset buttons 60.

By reason of the construction just described, if one should desire to gain access to the contactor 14 and its associated wiring, it is merely necessary to unscrew the cover 39 from the peripheral skirt 38 of the lower casing 12. The set screw 68 may then be loosened and the reset arm 66 detached from the sleeve 65 to get it out of the way. When this has been done, the pivot pin 49 may then be loosened and the contactor 14 along with its mounting plate 50 may be lifted slightly and rocked clockwise as viewed in Figs. 2 and 3, to disengage the plate 50 from the lugs 54. The contactor 14 and mounting plate 50 may then be dropped down relative to the bracket 45 through a distance corresponding substantially to the length of the slot 52 and then may be secured in any desired angular position by simply tightening head 59 of the pivot pin 49. When the necessary servicing has been completed, these members may be restored to their operative position by a reversal of the foregoing procedure.

For the purpose of precluding reclosure of the lower casing 12 with the contactor 14 and its mounting plate 50 displaced out of their normal operation position, provision is made for preventing the cover 39 from engaging or from seating against the threaded peripheral skirt 38 under such conditions. This is accomplished in the present instance by the use of a safety finger 70 rigidly fixed to the mounting plate 50 in depending relation therewith. In this case, the finger 70 may comprise a downward projection integral with one arm of an angle bracket 71. The finger is preferably secured to the plate 50 by means of the bracket 71 so that it extends well below the bottom edge of the plate 50. As indicated clearly in Fig. 3, the finger 70 is of sufficient length so that it will prevent engagement of the cover 39 with the threaded peripheral skirt if the members 14, 50 are allowed to remain clamped in substantially tilted or lowered position. Moreover, even if such members are almost in proper operative position, the finger 70 will still prevent seating of the cover 39 against the lower face of the peripheral skirt 38 so as to apprise the electrician that an abnormal condition exists.

For most explosion-proof applications, it will be desirable to isolate the chambers 11 and 12 from each other internally. This may be accomplished conveniently by the use of a detachable sealing sleeve 72 adapted to engage threads on the inside of the outer boss 32 of the upper casing 11. The sleeve 72 may be formed with a sealing well 74 which can be filled with sealing compound 75 when the housing 10 is initially wired.

While the housing as illustrated in the drawings is eminently well qualified for service in explosion-proof and dustproof applications, it might be desirable to insert resilient gaskets between the covers 30, 39 and their respective casing sections to adapt the housing 10 for use in raintight applications.

We claim as our invention:

1. In an explosion-proof switchgear housing, the combination of a generally circular casing having a depending threaded skirt, a detachable cover threadedly attachable to said skirt to define an explosion-proof chamber within said casing, a bracket fixed to the upper inside wall of said casing, a mounting plate having a perpendicular tongue with a longitudinal slot therein, said mounting plate also having at least one retaining aperture therein, a pivotal connection between said tongue and the depending end of said bracket, a headed lug projecting from the plane of said bracket and susceptible of engagement with the retaining aperture of said mounting plate, an electrical contactor fixed to said mounting plate, and a depending finger fixed to said mounting plate in downward projecting relation with the same, said finger being adapted to preclude seating of said cover on said casing skirt with said mounting plate and contactor in tilted or lowered condition.

2. In a sealed switchgear housing, the combination of a hollow circular casing open at the bottom, a cover threadedly attachable to the bottom of said casing to define a sealed chamber within the same, a depending bracket fixed to the top wall of said casing inside the same and terminating in a pair of closely spaced lugs, a switchgear mounting plate having a longitudinally slotted tongue thereon pivotally secured between said closely spaced lugs, and a pivot pin mounted transversely of said lugs, said pivot pin including means for clamping said lugs against said slotted tongue to maintain said mounting plate in selected angular positions relative to said bracket.

References Cited in the file of this patent

UNITED STATES PATENTS

| 1,224,880 | Kries | May 1, 1917 |
| 1,311,376 | Bissell et al. | July 29, 1919 |
| 1,330,301 | Brown | Feb. 10, 1920 |
| 2,209,213 | Vernon | July 23, 1940 |
| 2,284,613 | Hyde | May 26, 1942 |
| 2,402,840 | Olley | June 25, 1946 |
| 2,428,110 | Dorfman | Sept. 30, 1947 |
| 2,547,083 | Lundgren | Apr. 3, 1951 |

FOREIGN PATENTS

| 276,117 | Great Britain | Aug. 25, 1927 |